United States Patent
Cartarius et al.

(10) Patent No.: US 10,035,085 B2
(45) Date of Patent: Jul. 31, 2018

(54) BACKFLUSHING FILTER AND FILTER INSERT FOR THE SAME

(71) Applicant: Boll & Kirch Filterbau GmbH, Kerpen (DE)

(72) Inventors: Karsten Cartarius, Vettweiss (DE); Andreas Finsel, Köln (DE); Willi Rott, Bornheim (DE)

(73) Assignee: BOLL & KIRCHFIL TERBAU GMBH, Kerpen (DE)

( * ) Notice: Subject to any disclaimer, the term of this patent is extended or adjusted under 35 U.S.C. 154(b) by 150 days.

(21) Appl. No.: 14/897,711

(22) PCT Filed: Jun. 11, 2014

(86) PCT No.: PCT/IB2014/062142
§ 371 (c)(1),
(2) Date: Dec. 11, 2015

(87) PCT Pub. No.: WO2014/199321
PCT Pub. Date: Dec. 18, 2014

(65) Prior Publication Data
US 2016/0151726 A1    Jun. 2, 2016

(30) Foreign Application Priority Data
Jun. 11, 2013    (DE) .................... 20 2013 102 503 U (51) Int. Cl.
*B01D 29/07*    (2006.01)
*B01D 29/23*    (2006.01)
(Continued)

(52) U.S. Cl.
CPC ........... *B01D 29/682* (2013.01); *B01D 29/23* (2013.01); *B01D 29/668* (2013.01);
(Continued)

(58) Field of Classification Search
CPC ...... B01D 29/21; B01D 46/521; B01D 46/10; B01D 2201/12; B01D 2265/06; B01D 2201/0415; B01D 2201/291; B01D 35/16
(Continued)

(56) References Cited

U.S. PATENT DOCUMENTS 4,271,018 A  *  6/1981  Drori ..................... B01D 29/15
                                                         210/107
4,518,501 A     5/1985  Lennartz et al.
(Continued)

FOREIGN PATENT DOCUMENTS

DE        3235552 C2    3/1984
DE     202011000268 U1  5/2012

OTHER PUBLICATIONS

International Preliminary Report of Patentability for corresponding PCT/IB2014/062142 dated Dec. 15, 2015. The report is 10 pages.
(Continued)

*Primary Examiner* — Ana Fortuna
(74) *Attorney, Agent, or Firm* — Rankin, Hill & Clark LLP (57) ABSTRACT

A backflush filter for liquid media, having a filter housing formed by supporting cage(s) having at least two groups of apertures, and a filtering means supported on the supporting cage, the apertures of each group extend in parallel and are separated by ribs, and having a backflushing device arranged in the interior of the filter insert, is rotatable and has a slit, the backflushing device for flushing the filtering means via the slit and apertures, the direction of the backflushing device being reversible during the backflush cycle, the backflushing device having at least two separated flushing chambers having a corresponding slit, and also a hollow shaft, capable of limited rotary motion relative to the flushing chambers, which shaft having first and second radial outlets, the direction of the backflushing device being
(Continued)

reversible during backflushing, and driving means for movement of the flushing chambers and the hollow shaft, are provided for both directions of motion.

30 Claims, 8 Drawing Sheets

(51) Int. Cl.
    *B01D 29/68*     (2006.01)
    *B01D 39/10*     (2006.01)
    *B01D 24/00*     (2006.01)
    *B01D 33/00*     (2006.01)
    *B01D 21/00*     (2006.01)
    *B01D 29/94*     (2006.01)
    *B01D 29/66*     (2006.01)
    *B01D 35/30*     (2006.01)

(52) U.S. Cl.
    CPC ........... *B01D 29/684* (2013.01); *B01D 29/94* (2013.01); *B01D 35/306* (2013.01); *B01D 2201/287* (2013.01)

(58) Field of Classification Search
    USPC .......... 210/411, 232, 493.1, 493.2, 487, 405, 210/359, 333.01, 393
    See application file for complete search history.

(56) References Cited

U.S. PATENT DOCUMENTS

| | | | | |
|---|---|---|---|---|
| 4,906,353 | A * | 3/1990 | Breckenridge | C10G 35/095 208/111.05 |
| 5,733,464 | A * | 3/1998 | Bunch | B01D 29/15 119/215 |
| 5,848,231 | A * | 12/1998 | Teitelbaum | G01B 11/24 713/1 |
| 6,318,563 | B1 * | 11/2001 | Drori | B01D 25/26 210/411 |
| 2013/0306546 | A1 | 11/2013 | Cartarius et al. | |
| 2014/0021126 | A1 * | 1/2014 | Luo | B01D 29/23 210/333.01 |
| 2014/0237763 | A1 * | 8/2014 | Holsten | A47L 9/20 15/352 |
| 2015/0122723 | A1 * | 5/2015 | Orlans | B01D 29/055 210/411 |
| 2016/0151736 | A1 * | 6/2016 | Eck | B01D 3/008 95/211 |
| 2017/0128860 | A1 * | 5/2017 | Cartarius | B01D 29/682 |

OTHER PUBLICATIONS

International Search Report for corresponding PCT/IB2014/062142 dated Oct. 24, 2014, 2pgs.

* cited by examiner

BACKFLUSHING FILTER AND FILTER INSERT FOR THE SAME

The invention relates to a backflush filter for liquid media, especially for liquid fuels, having a filter housing that has a filter inlet, a filter outlet and a flushing connection, having a filter insert, which is fixedly arranged in the filter housing, through which the medium to be filtered flows from the inside to the outside and which is formed by means of at least one supporting cage, which has at least two groups of slot-type apertures, and at least one filtering means supported on the supporting cage, wherein the apertures within each group extend in parallel alignment with one another and are separated from one another by mutually parallel ribs of the supporting cage, and having a backflushing device, which is arranged in the interior of the filter insert, is rotatable in the filter insert about a longitudinal axis of the filter by means of an actuating drive, has at least one slit and extends over the height of the filter insert, said backflushing device being designed for zone-wise flushing of the filtering means via the slit and apertures and for carrying filter residues to the flushing connection during a backflush cycle, wherein the slot-type apertures of one group are arranged offset relative to those of the other group(s), and the apertures of one group lie in a common plane with the ribs of the other group(s). The invention furthermore also relates to a filter insert for a backflush filter, having a supporting cage for supporting a filtering means, wherein the supporting cage has at least two groups of slot-type apertures, which, within each group, extend in parallel alignment with one another and are separated from one another by mutually parallel ribs of the supporting cage, wherein the slot-type apertures of one group are arranged offset relative to those of the other group(s), and the apertures of one group lie in a common plane with the ribs of the other group.

BACKGROUND OF THE INVENTION

The invention starts from a backflush filter in accordance with DE 32 35 552 C2, which is incorporated by reference into the specification of this application along with any English translations thereof. The citation mentioned already describes the fundamental construction of a backflush filter having a filter insert that has a supporting cage with apertures which are arranged in groups that are offset relative to one another. DE 32 35 552 C2 describes a first embodiment, in which all the rectangular apertures extend with their longer side in the circumferential direction of the filter insert or in a plane perpendicular to the filter insert axis and in which the backflushing device is designed as a cylindrical flushing plate which can be moved up and down within the filter insert by means of a connecting rod. In a second embodiment, the individual apertures are aligned axially, i.e. the longitudinal side of the rectangular apertures extends parallel to the longitudinal axis of the filter insert, and the flushing device consists of a rotatable flushing arm. In order to clean the filtering means behind the various aperture groups by a reverse flow in the case of the last-mentioned embodiment with axially aligned apertures, the flushing arm has a plurality of slits, to each of which a separate shut-off valve is assigned, wherein the shut-off valves are controlled alternately so that in each case one of the flushing ducts is shut off from the flushing connection.

SUMMARY OF THE INVENTION

It is an object of the invention to simplify the design of the backflush filter of the type in question and to improve the intensity of reverse flow at the filtering means in the backflush cycle, especially when the available filtering surface area in the filter insert is increased.

To achieve the abovementioned object, the invention proposes, for a backflush filter of the type in question, that the backflushing device has at least two mutually separate flushing chambers, arranged vertically offset relative to one another and having associated slits, and a hollow shaft, which is capable of limited rotary motion relative to the flushing chambers and has a first radial outlet in the region of the first flushing chamber and a second radial outlet in the region of the second flushing chamber, which second radial outlet is arranged on the hollow shaft in a manner vertically offset and circumferentially offset relative to the first radial outlet, wherein the direction of movement of the backflushing device can be reversed by means of the actuating drive during the backflush cycle, and driving means for simultaneous movement of the flushing device and the hollow shaft in the respective direction of motion after a reversal of direction and for rotation of the hollow shaft and the flushing chambers relative to one another are provided for both directions of motion. The invention starts from a rotatable backflushing device, wherein, for the backflush process, the embodiment is such that the direction of motion of the backflushing device can be reversed or is reversed by means of the actuating drive during the backflush cycle. By means of this reversal of direction and by means of the construction of a backflushing device with a hollow shaft and flushing chambers, between which there can be a relative rotation during or after a reversal of direction, it is achieved in a manner that is simple in terms of design that either only one flushing chamber or a first group of flushing chambers or another flushing chamber or a second group of flushing chambers is active, while the other flushing chamber(s) in each case is/are inactive.

According to a preferred embodiment, the arrangement is such that the hollow shaft is coupled for conjoint rotation to the actuating drive, wherein coupling is preferably accomplished by means of a geared mechanism. In particular, the actuating drive can comprise a rack capable of linear motion, which meshes with a gearwheel coupled to the backflushing device for rotation of the backflushing device, wherein the actuating drive preferably comprises a pneumatic linear drive. According to the embodiment which is especially preferred, the gearwheel is connected for conjoint rotation to the hollow shaft, which, in turn, then drives the flushing chambers via the driving means after a reversal of direction.

For an optimized backflush cycle, in the inventive backflush filter, a flushing valve can furthermore be assigned to the sludge outlet, which valve can be opened by means of a movement of the actuating drive, in particular of the rack, and which is closed when the actuating drive or rack returns to an initial position. Through mechanical coupling of the opening and closing process of the flushing valve with the movement of the actuating drive or rack, it is possible in a simple manner to ensure that the flushing valve always opens when the backflushing device is performing a backflush cycle, and, at the same time, is closed when no backflush cycle is taking place. According to an advantageous embodiment, the rack can for this purpose be provided on its end face with a switching cam or switching surface for actuating the flushing valve. In particular, the flushing valve can be capable of being moved into an open position during the backflush cycle by means of the rack, counter to the restoring force of a return spring, whereby the force produced in the return spring during the opening of the flushing valve can ensure automatic closure of the flushing valve when the actuating device or rack returns to its initial position.

In order to obtain a long, maintenance-free operating time of a backflush filter, it is furthermore advantageous if the flushing chamber(s) can be rotated by at least 360 degrees in both directions of motion by means of the actuating device during a backflush cycle, preferably by more than 360 degrees, in particular by 360 degrees plus at least the arc length of a number of ribs and apertures such that the flow is fully formed at all apertures during a 360° rotation.

As a further preferred possibility, each flushing chamber and the associated slit can have a height which extends exactly or substantially exactly over the height of in each case one group of the slot-type apertures arranged offset relative to one another. Consequently, each flushing chamber has a flushing gap as an inlet, the height of which is matched to the longer side of the slot-type apertures in the supporting cage. In a construction which is particularly simple in terms of design, the flushing chambers comprise chamber modules of the same type, which are connected detachably to one another, wherein two chamber modules in each case are assembled to form a double chamber, wherein a separating disc is preferably positioned between two chamber modules of a double chamber. By means of the separating discs, the flushing chambers of a double chamber are consequently separated from one another. It is particularly advantageous if all the chamber modules are connected by means of through-rods to form a flushing chamber insert, which is supported with the ability for partial rotary motion on the hollow shaft. In this embodiment, the flushing inlets of all the flushing chambers can lie on a common axial line since the relative position of the hollow shaft, on the one hand, and the flushing chamber insert, on the other, determines which of the flushing chambers is connected via a radial outlet in the hollow shaft to the flushing connection and which flushing chambers are inactive at any given time.

It is particularly advantageous if the filter insert has a plurality of subgroups, wherein each subgroup comprises a group of first apertures and a group of second apertures, and the hollow shaft has precisely two radial outlets positioned in a circumferentially offset and vertically offset manner, wherein the first radial outlet is preferably assigned to the uppermost subgroup(s) and the second radial outlet is preferably assigned to the lower subgroup(s). If an uneven number of subgroups is present, the upper radial outlet can then be assigned only to that group of apertures of the central subgroup which is positioned higher, and the radial outlet which is positioned lower, or lower radial outlet, can additionally be assigned to the lower group of apertures of the central subgroup.

According to a preferred embodiment, the filtering means has a pleated, preferably multi-ply, filter fabric or filter cloth, being arranged between the supporting cage and a supporting casing, preferably formed of a perforated metal sheet, wherein each pleating fold is assigned a plurality of apertures of different groups of first apertures or of second apertures. Due to the pleating, the filtering means receives a plurality of pleating folds, wherein it is particularly advantageous, if the number of pleating folds is adapted to the number of apertures or ribs of one group. Especially in this embodiment, the configuration can be such that several apertures, which are arranged superimposed to each other on the supporting cage, are assigned to one pleating fold, while in the area of a specific flushing chamber either only one aperture of the groups of first apertures or one aperture of the groups of second apertures is situated, serving that the actual operating area of the backflushing is concentrated mostly solely on one pleating fold.

For achieving this, according to one possible embodiment, the apertures and/or the ribs of each group may run oblique with respect to a radial plane, thus in a plane which extends in direction of the filter centerline, and transverse to the centerline, wherein preferably, the apertures of the one group and the apertures of the other group run inclined to the radial plane by the same angle, but angled in opposite directions.

According to an alternative embodiment, the filtering means could be a pleated, preferably multi-ply, filter fabric or filter cloth with pleating folds, and furthermore all the ribs fit by means of a rib front into a pleating fold. It is particularly advantageous here if the rib front of each rib extends as far as the fold base of a pleating fold. By means of this embodiment, the pleated filtering means can be fixed by means of the ribs of the supporting cage, wherein, at the same time, stray flows from the side into the apertures are avoided by means of the ribs entering the pleating folds. Each pleating fold can preferably be assigned a plurality of apertures of different groups of first apertures or of second apertures. As the ribs of the next or other group are situated on an axial extension of an aperture, stray or bypass flows from above and/or from below within a pleating fold are effectively prevented at the same time. It is particularly advantageous here that fluid is drawn into the flushing chamber via the aperture and the slit during the backflush process, thereby exerting a suction on the pleating folds of the filtering means and bringing about additional sealing of the apertures through which there is an instantaneous reverse flow. Within the embodiment with ribs fitting into the pleating folds, it is particularly advantageous if all the ribs extend radially and are preferably formed symmetrically with respect to a radial plane, and/or if the rib front of each rib is designed as a rib tip tapering to the free front end thereof, wherein the front end is preferably rounded and is thereby matched to the rounding of the pleating fold.

A particularly simple structural design is also ensured if the supporting cage is of modular construction and has a plurality of mutually identical annular ribbed elements, which are clamped between two end covers, which allow radial sealing by means of a cover rim, wherein each ribbed element is preferably composed of plastic and has at least one base ring, on which a plurality of ribs positioned in a manner circumferentially offset relative to one another are integrally formed, wherein the supporting cage preferably has an even number of ribbed elements. According to one variant, two ribbed elements in each case can form a ribbed element pair, these being clamped between the end covers with their base rings abutting one another. In this embodiment, it is consequently possible, by using just one type of ribbed element, to produce one subgroup, which has two groups of aperture openings of the apertures that are positioned in an offset manner. However, it is also possible for a group or subgroup to be formed completely by means of a ribbed element as a modular component.

According to one embodiment, the ribs may be formed on the front side of the base ring and run inclined to a radial line. It will be apparent, that for this purpose the ribs need to have a suitable length, whereby the supporting cage receives a specific thickness. Especially, several pairs of ribbed elements could be arranged between the end covers, wherein an intermediate ring is then arranged between two pairs of ribbed elements. For the production of such a modularly constructed support cage, it is preferably advantages if all ribs of the rib elements comprise at their free rib ends integrally formed locking pins for interlocking into locking holes in the end covers or intermediate rings.

Within an embodiment comprising ribs fitting into a pleating folds, the ribs of the ribbed elements can be provided, preferably alternately, at their free rib ends with integrally formed locking pins or locking holes, and the base ring can be provided on one face, if appropriate in a correspondingly alternating manner, with locking pins and locking holes, which interact with one another in the assembled state, wherein the rib fronts of the ribs extend only radially outside the base ring. If the rib fronts of the ribs extend radially outside the base ring, it is particularly advantageous if the rib fronts project upwards and downwards on both sides beyond the faces of the base ring. In this case, the rib fronts can preferably project beyond the face of the base ring which is provided with the locking holes, the projection corresponding to the thickness thereof in the axial direction, with the result that, in the assembled state of two ribbed elements inserted into one another, the rib of the adjacent group extends in an axial direction as far as the aperture of the next group, and support for the pleating fold is also ensured in the adjoining regions of an aperture so as to prevent bypass flows in a particularly effective manner.

As a further preference, the end covers can be connected to one another by means of anchor rods, wherein the supporting shell and the filtering means arranged between the supporting shell and the supporting cage are also arranged, in particular enclosed, between the end covers.

The aforementioned object is also achieved by a generic filter insert, at which according to one embodiment the apertures and\or the ribs of each group run oblique with respect to a radial plane, with the apertures of the one group and the apertures of the other group run inclined to the radial plane by the same angle, but inclined in opposite directions. Such a filter insert especially is advantageous if used together with a pleated filtering means.

An alternative embodiment of filter insert of the type in question having a supporting cage for supporting a filtering means, wherein the supporting cage has at least two groups of slot-type apertures, which, within each group, extend in parallel alignment with one another and are separated from one another by mutually parallel ribs of the supporting cage, wherein the slot-type apertures of one group are arranged offset relative to those of the other group(s), and the apertures of one group lie in a common plane with the ribs of the other group(s), may solve the above object by virtue of the fact that the filtering means comprises a pleated, preferably multi-ply, filter fabric or filter cloth, and that all the ribs fit by means of a rib front into respective pleating folds.

Within this embodiment with ribs fitting into the pleating folds, it is especially advantageous if all the ribs extend radially and are preferably formed symmetrically with respect to a radial plane, and/or if the rib front of each rib is designed as a rib tip tapering to the free front end thereof, wherein the front end is preferably rounded. Furthermore, each pleating fold can be assigned a plurality of apertures of different groups of first apertures or of second apertures.

Within both alternative embodiments with straight extending or inclined extending ribs, the supporting cage of the filter insert can be of modular construction and can have a plurality of mutually identical annular ribbed elements, which are preferably enclosed between two end covers, wherein each ribbed element is preferably composed of plastic and has at least one base ring, on which a plurality of ribs positioned in a manner circumferentially offset relative to one another are integrally formed, and wherein the supporting cage preferably has an even number of ribbed elements. In a possible variant, two ribbed elements in each case form a ribbed element pair, these being clamped between the end covers with their base rings abutting one another. However, it is also possible for one group or subgroup to be formed completely by means of a ribbed element as a modular component.

It is particularly advantageous for a filter insert having oblique ribs, which are preferably formed on the front side of the base rings and to run inclined to a radial line, if several ribbed elements are arranged between the end covers, wherein an intermediate ring is arranged between two ribbed elements. Preferably, each rib of the rib elements could comprise at its free rib end an integrally formed locking pin for interlocking with locking holes in the end covers or intermediate rings. The end covers could be connected to one another by means of anchor rods, with the supporting cage and the filtering means, preferably existing of a pleated filter fabric, is also arranged and enclosed between the supporting cage and the supporting casing. Provided that the filtering means is pleated, it is particularly advantageous if each pleating fold is assigned to several superimposed apertures of the supporting cage.

Within the alternative embodiment of a filter insert having ribs fitting into the pleating folds, it is particularly advantageous if the ribs of the ribbed elements are provided alternately at their free rib ends with integrally formed locking pins or locking holes, and the base ring is provided alternately on one face with locking pins and locking holes, which interact with one another in the assembled state, wherein the rib fronts of the ribs preferably extend radially outside the base ring. Insofar as the rib fronts of the ribs extend radially outside the base ring, the rib fronts can preferably project upwards and downwards in the axial direction on both sides beyond the faces of the base ring, wherein the rib fronts preferably project beyond the face of the base ring which is provided with the locking holes, the projection corresponding to the thickness thereof in the axial direction, as a result of which each pleating fold is supported by means of the ribs up to a point directly adjacent to an aperture.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DESCRIPTION OF PREFERRED EMBODIMENTS

Figure 1:
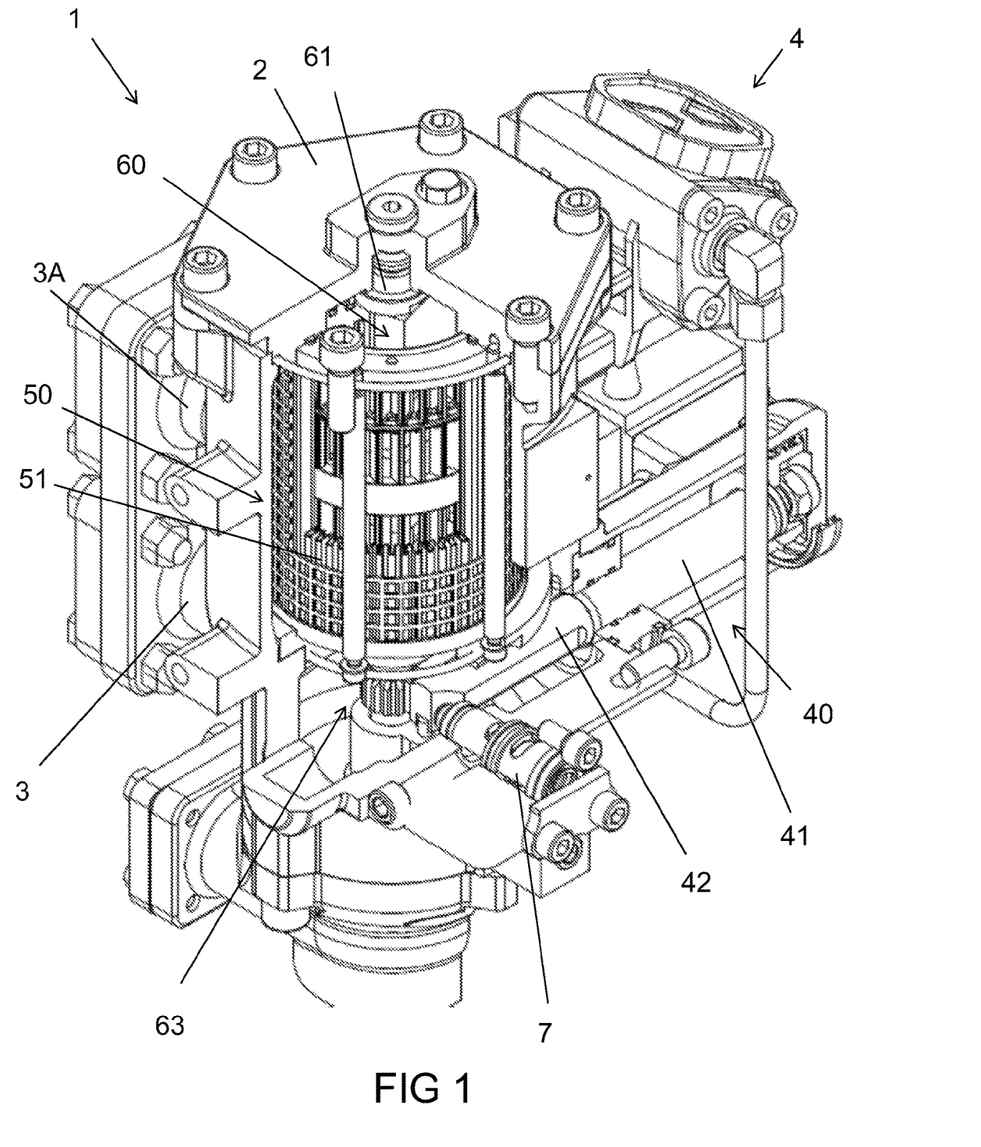
FIG. 1 shows a backflush filter according to the invention in perspective view, the filter being schematically simplified and partially cut away.
Figure 5:
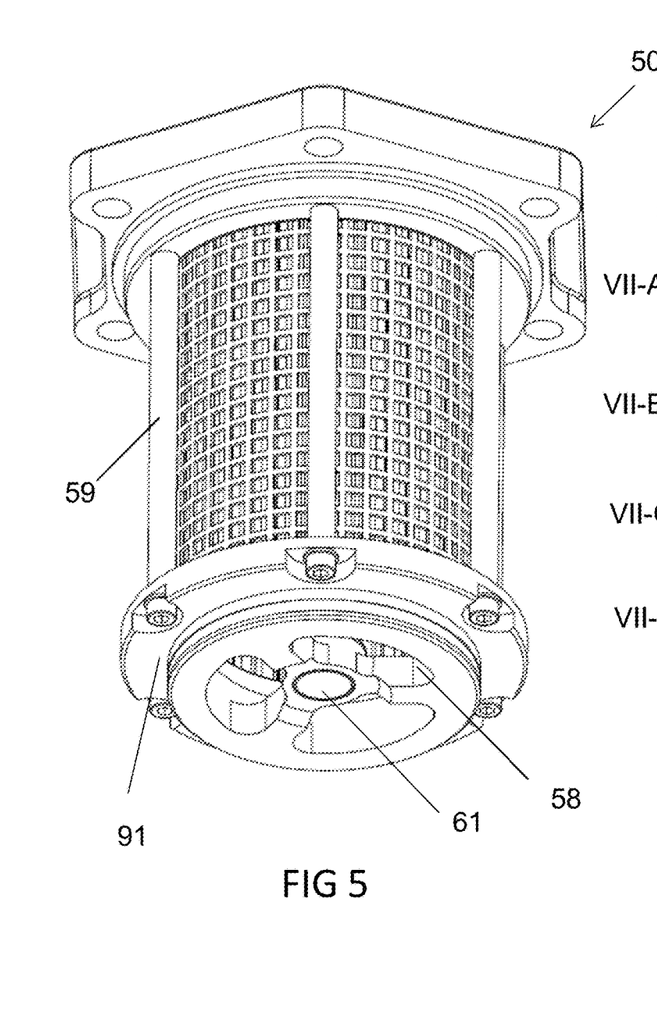
FIG. 5 shows the filter insert which can be inserted in the backflush filter according to FIG. 1 in a detail perspective view according to a first embodiment.

Referring now to the drawings wherein the showings are for the purpose of illustrating preferred and alternative embodiments of the invention only and not for the purpose of limiting the same, FIG. 1 shows a backflush filter according to certain aspects of the invention for the reversible flow of liquid media, especially liquid fuels, and is denoted overall by the reference sign 1. The backflush filter has a filter housing 2, shown only in part, in which all the functional parts for filtering operation to filter a liquid are arranged. The liquid flows into the housing 2 of the backflush filter 1 via a filter inlet 3, passes through a filtering means 51 of a filter insert, which is denoted overall by the reference sign 50 in the FIGS. 1 to 9, and can then be fed as a filtrate to a downstream operating unit, e.g. an engine, via the filter outlet 3A. During this process, the medium to be filtered flows through the filtering means 51 of the filter insert 50 from the inside outwards and, for this purpose, can enter, in particular from below, the interior of the filter insert 50 shown in detail in FIGS. 5 and 6 via the openings 58.

The differential pressure between the filter inlet 3 and the filter outlet 3A can be monitored by means of a differential pressure indicator 4, which is flanged to the filter housing at the side, and cleaning of the filtering means 51 of the filter insert 50 by means of a backflushing device 60 takes place in accordance with the differential pressure and/or in a timed manner, said backflushing device being mounted rotatably on the filter housing 2 and being rotatable both clockwise and anticlockwise by means of an actuating device denoted overall by the reference sign 40. As will be explained below, the backflushing device 60 comprises a central hollow shaft 61, the cavity of which is connected via a system of passages in the filter housing 2 to a flushing connection 6, which is shut off by means of a flushing valve 7 in the pure filtering mode of the backflush filter 1, i.e. when the backflushing device 60 is not in operation. The flushing valve 7 or flushing connection 6 can furthermore be assigned an overflow valve, which opens when pressure peaks are exceeded, if appropriate.

Figure 2:
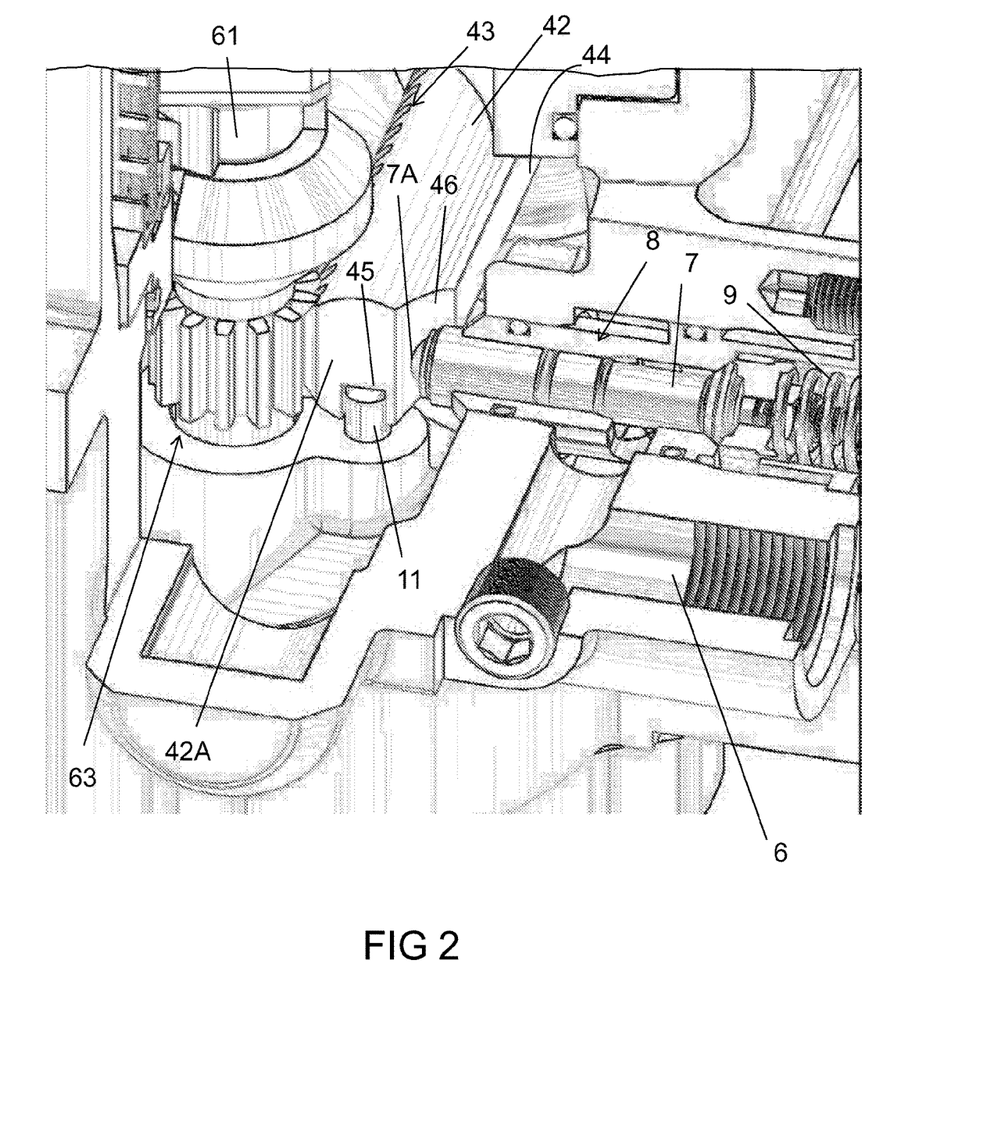
FIG. 2 shows a detail view of the actuating device of the backflush filter from FIG. 1.

In the preferred illustrative embodiment, shown in the figures, of a backflush filter 1, the actuating device 40 comprises a pneumatically actuable piston-type linear actuator 41 capable of linear motion, wherein the piston is coupled to a rack 42 which, although being partially rounded, as can be seen particularly well from FIG. 2, is provided on one flank with a row of teeth 43 and on the opposite flank with a flat 44, while the upper side is rounded and the underside is provided with a guide slot 45. By means of the guide slot 45, the rack 42 is guided on a guide pin 11 in the interior of the filter housing. At the transition to the flat 44, the end face 42A of the rack 42 has a cam surface 46, which is arched or embodied as an oblique ramp and by means of which a switching head 7A of the flushing valve 7 is in contact or comes into contact when the rack 42 moves. The cam surface 46 forms the switching cam for the flushing valve 7, for which purpose the switching head 7A is designed as a spherical head or comprises a steel ball and the cam surface 46 is curved in such a way that, in the initial position of the rack 42 shown in FIG. 2, the valve tappet 8 of the flushing valve 7 is preloaded into a closed position by the restoring force of a spring 9, while the valve tappet 8 adopts its open position when the rack 42 is moved by an amount such that the switching head 7A is resting against the flat 44. By means of this measure, the movement of the backflushing device (60, FIG. 1) and the opening and closing of the flushing valve 7 are motion-coupled, and it is ensured that the flushing valve 7 is always opened and remains open in the backflush cycle as soon as the rack 42 has been moved by a certain amount, until the actuating device has moved the rack 42 back into its initial position shown in FIG. 2.

The set of teeth 43 on the rack 42 meshes with a gearwheel 63, which is coupled for conjoint rotation to the hollow shaft 61 in the illustrative embodiment shown. The path of motion of the actuating device 40 and the number of teeth in the set of teeth 43 on the rack 42 and on the gearwheel 63 are matched to one another in such a way that, after the opening of the flushing valve 7, the backflushing device 60 can be moved further by more than 360 degrees, first of all in one direction of motion—in the clockwise direction in the illustrative embodiment shown—and then, after reversal of the direction of motion of the pneumatic drive of the actuating device 40, in the opposite direction and thus in the anticlockwise direction, once again by more than 360 degrees. Since, as will be explained, the flushing chambers 64 of the backflushing device 60 can be rotated by a certain angle relative to the hollow shaft 61 before they are taken along in one or other direction of motion by driving means in the illustrative embodiment shown, the path of motion of the hollow shaft is considerably more than 360 degrees. The hollow shaft can preferably be rotated by 360° plus backlash between the flushing chambers and the hollow shaft plus the actuating path for opening and closing the flushing valve, wherein an additional path is provided so that the flushing chambers 64 can clean the filter fabric 51 through a further 360 degrees in the driving position when the flushing valve 7 is open. The hollow shaft 61 can therefore preferably be rotated by more than 400 degrees in each direction of motion and/or the rack has at least 15% more teeth than the gearwheel 63.

Figures 3, 4:
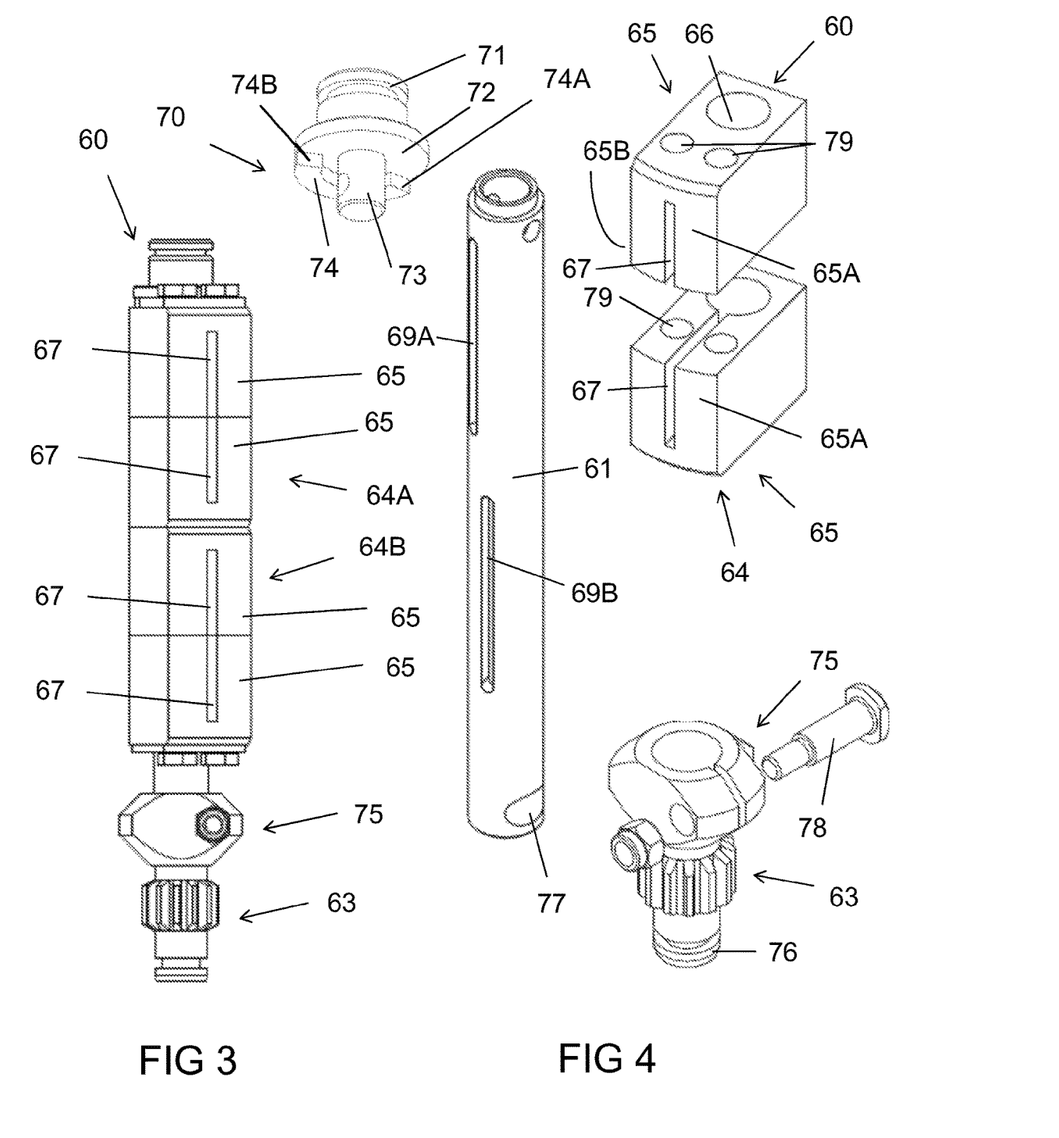
FIG. 3 shows an isolated view of the hollow shaft together with the flushing chambers with a backflush filter according to FIG. 1.
FIG. 4 shows the flushing device according to FIG. 3 in an exploded view.

Reference is now made first of all to FIGS. 3 and 4, in which the backflushing device 60 for the backflush filter according to FIG. 1 is shown in detail. As a central component, the backflushing device 60 has a hollow shaft 61, which here is a tube section, which is provided in the illustrative embodiment shown with 2 mutually separate flushing chambers 64A and 64B arranged in a manner vertically offset relative to one another. The upper flushing chamber 64A forms a first double chamber and the lower flushing chamber 64B forms a second double chamber, wherein each double chamber comprises mutually identical chamber modules 65 assembled so as to be offset by 180 degrees relative to one another, and each chamber module 65, as can be seen particularly clearly in FIG. 4, has a through hole 66 for the passage of the hollow shaft 61 and a slot open on one side at the edge as a slit 67 on an end face 65A, projecting laterally relative to the hole 66, of the chamber modules 65. Two chamber modules 65 can be inserted one inside the other to form a double chamber or flushing chamber 64. A separating disc 78 could also furthermore be arranged between two chamber modules 65, which disc would then separate even the respective slots or slits 67 in the individual chamber modules 65 outside the through hole 66, giving rise to four separate flushing chambers. In the exploded view according to FIG. 4, only one of the two double chamber modules assembled from chamber modules 65 is shown. The hollow shaft 61, in turn, is provided with two radial outlets 69A, 69B, which are positioned in a manner circumferentially offset relative to one another and vertically offset relative to one another and the angular offset between which is approximately 26 degrees in the illustrative embodiment shown so that the radial offset ensures that only one of the radially inner ends of the slots or slits 75 is reached by the radial outlets 69A, 69B. The upper radial outlet 69A has a length in the axial direction of the hollow shaft 61 which is matched to the length of the slots or slits 67 of an upper double chamber formed by two chamber modules 65, and the lower radial outlet 69B correspondingly has a length in the axial direction which is matched to the other double chamber. The upper end of the hollow shaft 61 is closed by means of a bearing plug 70, the upper section of which forms a bearing stub 71 for supporting the hollow shaft 61 on the filter housing and which, on its underside 72, is provided, around a closure plug 73 that can be inserted sealingly into the hollow shaft, with a driving ridge 74, which ends in two end edges 74A, 74B, which are offset circumferentially relative to one another and which have an angular spacing from another of, in this case, 206°, matching the angular offset of the radial outlets 69A, 69B. By means of the end edges 74A, 74B, the driving ridge 74 forms driving stops as driving means, by means of which the flushing chambers 64A and 64B, which are arranged on the hollow shaft 61 with a limited capacity for movement in the direction of rotation, are taken along in one or other direction of motion of the hollow shaft 61 when there is a rotation of the flushing device 60 in the event of a reversal of direction. During this process, the end edges 74A, 74B may press against the rear side 65B of the uppermost flushing chamber 64A. All the flushing chambers 64A, 64B or chamber modules 65 are connected to one another in such a way by means of through-rods or screw fasteners, which pass through associated holes 79 in the individual chamber modules 65, to form a flushing chamber insert that all the slots or slits 67 extend in a manner aligned along an axial line, as can be clearly seen from FIG. 3. In the illustrative embodiment shown, the gearwheel 63 with the integrally formed lower bearing stub 76 is fastened for conjoint rotation to the lower end of the hollow shaft 61 by means of a clamping ring 75, for which purpose the hollow shaft 61 is provided with a notch 77 in the edge for the passage of a clamping screw 78. While the gearwheel 63 is therefore connected for conjoint rotation to the hollow shaft 61, the flushing chamber insert is capable of limited rotary motion relative to the hollow shaft 61, namely by an amount equal to the circumferential offset between the radial outlets 69A, 69B, for which reason the lower radial outlet 69B and the slots or slits 67 in the lower flushing chamber 64B are in alignment with one another when the hollow shaft 61 is rotated in one direction, in this case clockwise, as a result of which they are open to the cavity of the hollow shaft 61, whereas, when the backflushing device is rotated in the opposite direction, in this case anticlockwise, the upper radial outlet 69A is correspondingly in alignment and therefore open to the slots and hence slits 67 in the upper flushing chamber 64A. The clearance fit between the outer circumference of the hollow shaft 61 and the hole 66 in the chamber modules 65 is chosen so that, in the case of non-aligned arrangement, essentially no fluid can pass into the radial outlet 69A, 69B angularly offset relative to the slits 67. If a separating disc were additionally to be arranged between two chamber modules, a flushing flow built up by differential pressure could even be concentrated exclusively on the region of action of a chamber module 65 in each case, while, in the illustrative embodiment shown, it acts in each case on a flushing chamber 64A or 64B embodied as a double chamber.

This construction of the backflushing device 60 has a particularly advantageous effect in conjunction with the special construction of the filter insert 50 and especially that of a supporting cage 52 for the filter insert 350. The construction of the filter insert according to the first embodiment will now be explained especially with reference to FIGS. 5 to 9. The filter cage 52 within this embodiment is at the inner circumference designed such that along the height of the filter insert 50 are four groups 53A, 53B, 53C, 53D of slot-type apertures 53 arranged in a manner vertically offset one above the other. All apertures 53 comprise at the inner circumference of the supporting cage 52 substantially a rectangular cross-section, with the longer side of the aperture running parallel to the central axle of the filter insert 50 or the revolving axle of the backflushing unit, while the shorter side of the aperture extends in circumferential direction of the cylindrical supporting cage 52, with two adjacent apertures 53 of one group in each case being separated from one another by mutually parallel ribs 54. With reference to group 53A, apertures 53 and ribs 54 thus always alternate in a manner distributed over the circumference. In the adjacent group 53B situated vertically offset relative to group 53A, for example, apertures 53 and ribs 54 likewise alternate, with the arrangement of the ribs 54 in this adjacent group being such that in each case one rib 54 of group 53B lies on an axial extension of an aperture 53 of the adjacent group 353, and vice versa. Thus, if viewed in the axial direction, one rib 54 of the group 53B lies in the extension of one aperture 53 of the group 53A, why one aperture 53 of the group 53B lies in extension of one rib 54 of the group 53A. In principle, the same configuration has been done in the groups 53C and 53D. The groups 53A and 53B are building an upper subgroup and the groups 53C and 53D are building a lower subgroup, while with in one of the subgroups, for example, the group 53A (or 53C) constitutes the first group of apertures 53 and the group 53B (or 53D) constitutes the second group of apertures. Due to the separated double chambers 64A, 64B in the backflushing device. It makes no difference with in the middle groups 53B, 53C, whether the ribs 54 of group 53B, as within the shown embodiment, are lying adjacent to an aperture 53 of the group 53C, or whether within these two groups 53B, 53C (not shown) in each case one aperture 53 or rib 54 is positioned in axial extension to one another. It is only important that, in both subgroups, in each time one aperture 53 in the one group 53C (or 53A) lies in axial extension of a rib 54 in the other group 53D (or 53B) of the same subgroup, and vice versa, serving that the apertures 53 of the one group 53C will be positioned offset to the apertures of the other group 53D.

The offset arrangement of apertures 53 and ribs 54 is configured on the inner side of the supporting cage 52. The filtering means 51 is positioned on the outer side of the supporting cage 52, wherein in the shown embodiment, the filtering means 51 is a pleated filter fabric having a plurality of pleating folds 51', as will be apparent especially from FIGS. 7 and 8. All pleating folds 51' extend in axial direction, i.e. parallel to the central centerline of the supporting cage 52 or the filter insert 50, respectively. In each time, one of the pleating folds 51', which is open to the inside of the pleated filtering means 51, lies with both of its ply bows on adjacent rips 54 of the group of apertures. The pleated filter fabric 51 comprises a radial direction a certain depth and is enclosed on the outside from a supporting casing 55, which keeps or tensions the pleated filtering fabric 51 in the intended alignment and position relative to the ribs 54 and apertures 53 within the filter insert 50. The individual ribs 54, and thus also the apertures 53 existing between two adjacent ribs 54, extend inclined to an imaginary radial line. In FIG. 7, for sectional views along the lines VII-A, VII-B, VII-C, VII-D are shown, for which views corresponds to different section planes being perpendicular to the center axle of the filter. Each of the section planes is positioned in the middle of one group 53A, 53B, 53C, or 53D of apertures 53. By comparing the individual sectional views, it can be seen that within the groups 53A, 53C, the inclination of the apertures 53 is in the first direction, while the inclination of the apertures 53 within the groups 53B, 53D, and thus also that of the ribs 54, is in the opposite direction. the inclination of the ribs 54 or apertures 53, respectively serves to compensate the circumferential offset from two adjacent pleating folds 51' such that within a pleated filtering fabric 51 extending over the entire height of the filter insert 50, the inner ply bows always touch a rib 54 of the supporting cage 52, while one aperture 53 on the outer circumference of the supporting cage 52 will be positioned centered to a single plead fold 51', and this in all groups 53A, 53B, 53C, 53D of apertures 53. This exact positioning of the filter fabric 51 relative to the filter cage 52 effects that exactly one plead fold 51' will be in the operating range of a specific aperture 53. By inclination of the ribs 54 and the inclined orientation of the apertures 53, the offset between the apertures of one group 53A, 53C, and that of the other group 53B, 53D relatively to one pleating fold 51' will be compensated.

Figure 6:
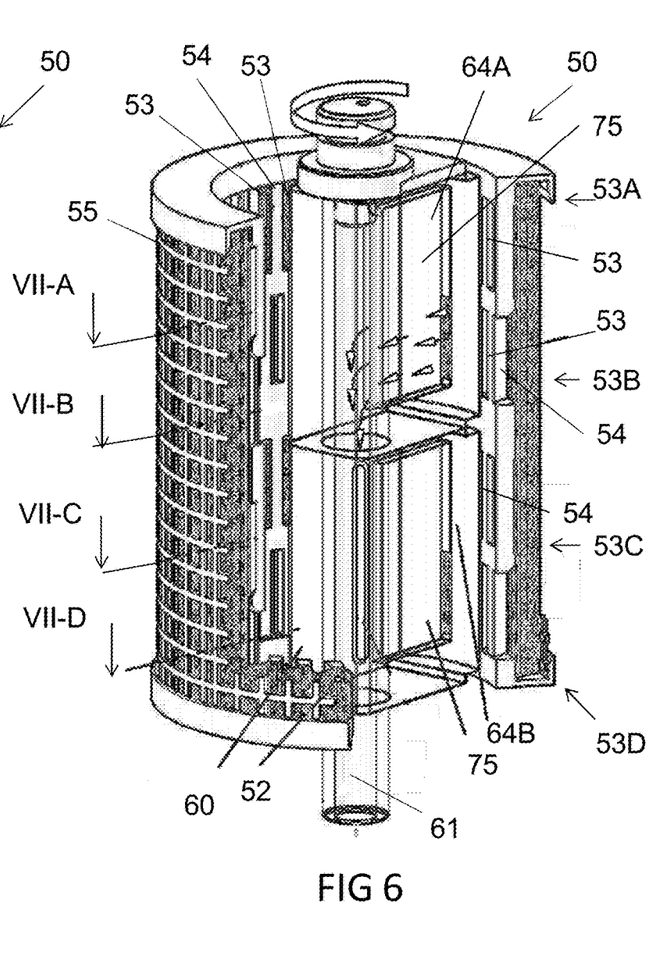
FIG. 6 shows the filter insert from FIG. 5 schematically and in a partially cutaway view in the backflush cycle.
Figure 7A:
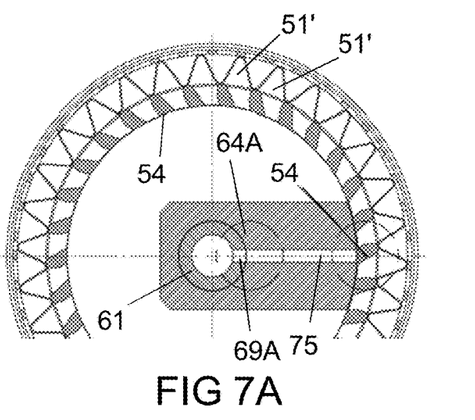
FIG. 7A-7D is a sectional view along horizontal plane VII-A to VII-D in FIG. 6.
Figure 7B:
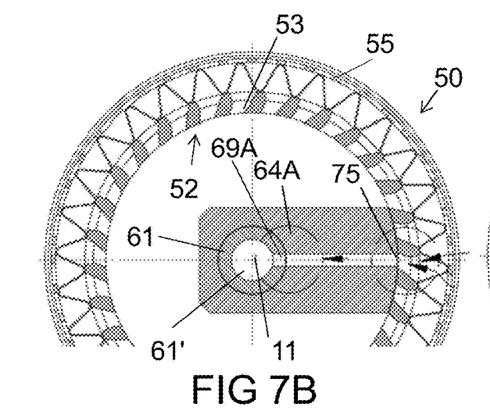
Figure 7C:
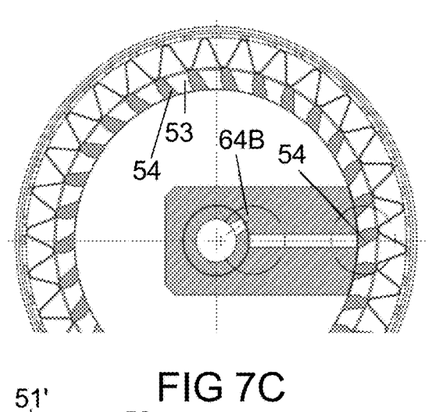
Figure 7D:
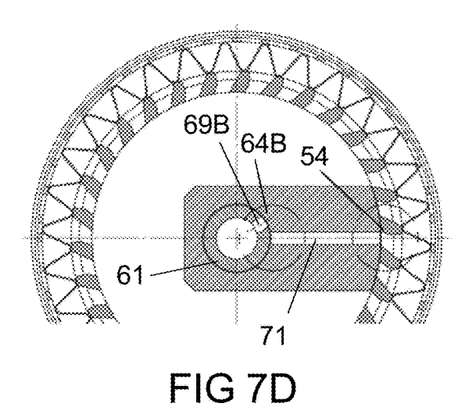
Figure 8:
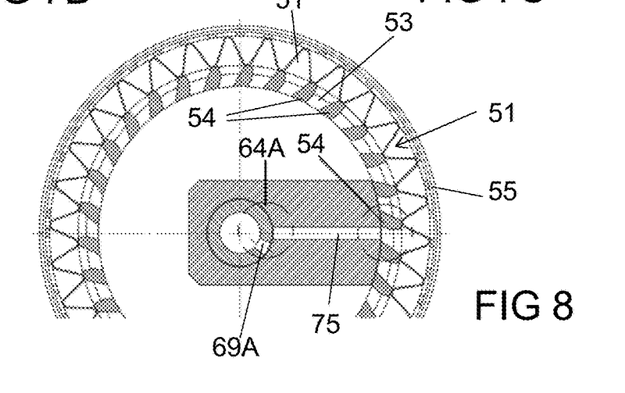
FIG. 8 is a sectional view similar to FIG. 7B after reversion of the moving direction.

The said orientation of apertures 53, ribs 54 and pleating folds 51' does not have an effect in the filtering mode, but it has an effect in the backflushing mode during a backflushing cycle, and this will now be briefly explained. By way of example, FIG. 6 shows, schematically by means of the arrows, the backflush effect during a backflush cycle at a certain point in time. In the illustration according to FIG. 6, the hollow shaft 61 and hence the backflushing device 60 moves anticlockwise. Backflushing, i.e. cleaning the inside of the filtering means 51, takes place in the region of action of one single active aperture 53 in front of flushing chamber 64B, which is active at this point in time owing to the relative position of the hollow shaft 61 and the flushing device 60. In FIG. 6, backflushing is taking place at this time only at one of the apertures 53 in the lower group 53B of the upper subgroup. Admittedly, the slits 75 of both chamber modules 65 of the upper flushing chamber 64A are in alignment with the section of the radial outlet 69A of the hollow shaft 61. However, since the slot or slit 75 at the face of the upper flushing chamber 64A, which is embodied as a double chamber, is situated partially or completely in front of a rib 54, flushing of the filtering means 51 can take place only via that surface of the flushing chamber 64A which is currently free in this rotational position. However, if the hollow shaft 61 rotates further in the direction of motion, the flushing chamber 64A temporarily acts partially over the height of the slot or slit 75 in the upper flushing chamber 64A. As long as there is no change in the direction of motion, the radial outlets 69B in the hollow shaft 61 are angularly offset relative to the slits 75 of the flushing chamber 64B, for which reason no backflushing takes place in the lower subgroup during the movement of the backflushing device in this direction of rotation. Backflushing takes place during the backflush cycle because, as explained with reference to FIGS. 1 and 2, the backflush valve is opened whenever the rack of the actuating drive leaves its initial position in order to rotate the backflushing device 60, and the cavity 61' in the hollow shaft 61 is thereby connected to the flushing outlet.

In one direction of rotation, flushing of the folds 51' of the filtering means 51 is thus effected by means of the upper flushing chamber 64A in the region of the upper groups 53A, 53B of apertures 53. After a reversal of the direction of rotation of the backflushing device, for which purpose the rack of the actuating drive (cf. FIG. 1) is pulled back in the direction of the initial position, the backflushing action is shifted to the lower two groups 53C, 53D of apertures via the lower backflushing chambers 64B. In this case, there is first of all a relative rotation between the hollow shaft 61 and the flushing device 60 by movement of the hollow shaft in the opposite direction until the second stop (74B) on the driving means (74, FIG. 4) comes into contact with the associated flushing chamber 64A of the flushing device 60 and then takes the flushing device 60 along.

After reversal of direction, in principle the same processes as those explained under reference to FIG. 7A to 7D take place, but in the region of the lower flushing chamber 64B in each case. The sectional view in FIG. 8 corresponds to the sectional view 7B, but due to the offset between radial outlet 69A and slit 75 and flushing chamber 64A, no backflushing of the filtering means takes place in the area of this flushing chamber, regardless whether the corresponding slit 75 lies aligned with an aperture 53 or not.

Figure 9:
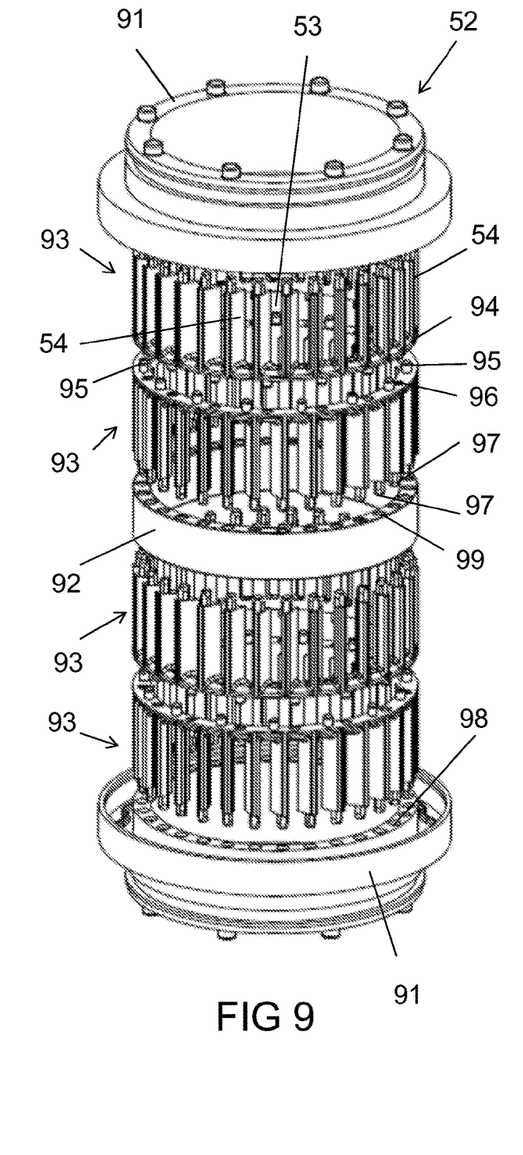
FIG. 9 is a detailed view of the configuration of the supporting cage from the filter insert according to FIG. 5, in an exploded view.

FIG. 9 shows an embodiment of the supporting cage 52 for the filter insert 50 according to the invention having a construction particularly advantageous concerning production. The supporting cage 52 includes just three different individual parts, namely two end covers 91 of identical construction, an intermediate ring 92 and four mutually identical ribbed elements 93. Each ribbed element 93 preferably is composed of plastic with a base ring 94, on one side of which offset positioned, inclined ribs 54 are formed integrally in such a way that inclined apertures 53 are formed between two inclined rib 354, wherein on the back side of the base ring, pins 95 and pinholes 96 are formed at alternately. The pinholes 96 and pins 95 are distributed on the one side of the base ring 94 such that two base rings 94 can be inserted into each other with their back sides facing each other. As the ribs 54 on the coupled ribbed elements 93 are inclined, the intended effect of apertures 53 or ribs 54 being orientated oblique in opposite directions is achieved. The free front parts of the ribs 54 in turn comprise locking pins 97, which are able to interlock in corresponding locking holes 98 in the end covers 91 or in locking holes 99 in the base ring 92. Thus, by simply providing three different elements, it is possible to construct a modular supporting cage, while easily an additional intermediate ring as well as further pairs of ribbed elements could be arranged between two end covers in order to obtain axial longer filter insert having then six groups of apertures. In order to obtain even longer sizes of filter inserts, additional intermediate rings and ribbed elements could be arranged, wherein at the end, the two end covers 91 will be clamped by means of anchor rods (59, FIG. 5) such that the supporting cage, the pleated filtering for a break and the supporting casing is fixed between the two end covers 91. By introducing an adhesive, the pleating of the filtering means can be enclosed between the end covers and the supporting cage in a manner which is radially sealed off. Instead of an adhesive bond, it would also be possible to provide a weld seam, or a sealing bead is moulded on. The anchor rods (59, FIG. 5) serve to provide additional stability, to create an insert which can be removed as a whole and to fix the element between the end covers, wherein one of the end covers can have the openings (58, FIG. 5) as integral features.

Figures 10, 11:
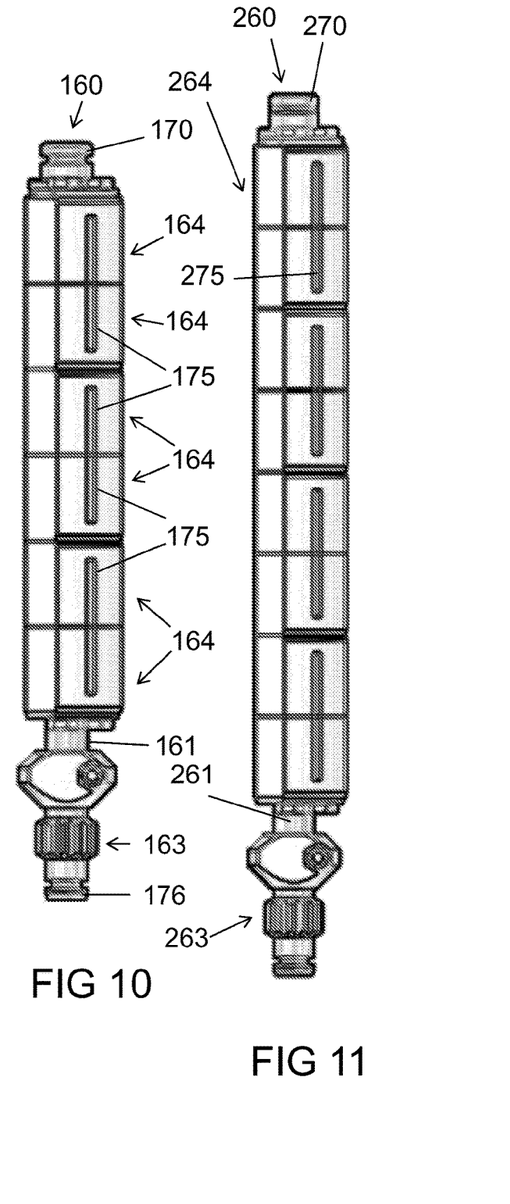
FIG. 10 shows a flushing device having three double flushing chambers.
FIG. 11 shows a flushing device having four double flushing chambers.

The FIG. 1 to 9 show a construction of a backflush filter having respectively two first groups and two second groups of apertures, including separate flushing chambers assigned thereto, thus, with a total of four flushing chambers. The modular construction both of the supporting cage 52 and of the flushing device 60 makes it possible to increase the available filtering surface area in a relatively simple manner, using the same elements, by extension of the supporting cage and, correspondingly, a longer configuration of the backflushing device, in which case the housing is larger. FIG. 10 shows a backflushing device 160 with a total of 6 flushing chambers 164, of which in each case two are combined to form a double chamber, as described above, thereby giving rise to a total of three subgroups, namely an upper subgroup, a central subgroup and a lower subgroup, which each comprise two flushing chambers. As in the previous illustrative embodiment, the hollow shaft 161 is provided at the upper end with a bearing plug 170 including the driving means and at the lower end with a gearwheel 163 and a lower bearing stub 176. The radial outlets (not shown) in the hollow shaft 161 can be arranged in such a way that one of the two radial outlets is assigned to the three lowermost flushing chambers 164 together with the associated slit 175, while the higher radial outlet is assigned to the three upper flushing chambers 164 together with the associated slit 175. Depending on the arrangement of the apertures in the supporting cage, either one flushing chamber 164 or two flushing chambers 164 are active in the backflushing cycle in one direction of rotation. The radial outlets in the hollow shaft could also be arranged in a different way. To this end, the lower radial outlet could extend over the lower four flushing chambers, and the upper radial outlet could extend over just the upper two flushing chambers, thereby slightly increasing the flushing intensity at the upper two flushing chambers 164 and hence at the flushing chambers situated furthest away from the flushing valve as compared with the other flushing chambers.

FIG. 11 shows another illustrative embodiment of a backflushing device 260, in this case with a total of eight flushing chambers 264, the slits 275 of which are all arranged on a common axial line, as in the previous illustrative embodiment. As in the previous illustrative embodiments, the hollow shaft 261 is provided at the lower end with a gearwheel 263 and at the upper end with a bearing plug 270. It would also once again be possible to provide just two radial outlets in the hollow shaft 261, with each radial outlet extending over a total of four flushing chambers 264. Of course, it would also be possible for four radial outlets to be provided, with in each case two radial outlets being arranged on the same axial line and the other two radial outlets being positioned in the hollow shaft in a manner offset by the predetermined angle.

The FIGS. 12 to 18 show a second embodiment of a filter insert 350 with pleated filtering means 351. Parts with the same function as in the first embodiment receive reference numerals plus 300 compared to the first embodiment. The filter insert 350 and especially that of a supporting cage 352 for the filter insert 350, as now explained especially with reference to FIGS. 9 to 15. The filter insert 350 has a supporting cage 352, which is configured in such a way that, once again, four groups 353A, 353B, 353C, 353D of slot-type apertures 353 arranged in a manner vertically offset one above the other are formed in a manner distributed over the height of the filter insert 350. Two adjacent apertures 353 of a group 353A are in each case separated from one another by mutually parallel ribs 354. With reference to group 353A, for example, apertures 353 and ribs 354 thus always alternate in a manner distributed over the circumference. In the adjacent group 353B situated vertically offset relative to group 353A, for example, apertures 353 and ribs 354 likewise alternate, with the arrangement of the ribs 354 in this adjacent group being such that in each case one rib 354 of group 353B lies on an axial extension of an aperture 353 of the adjacent groups 353A and 353C, and vice versa. In the illustrative embodiment shown, this applies to all the groups.

Figures 12, 13, 14, 15:
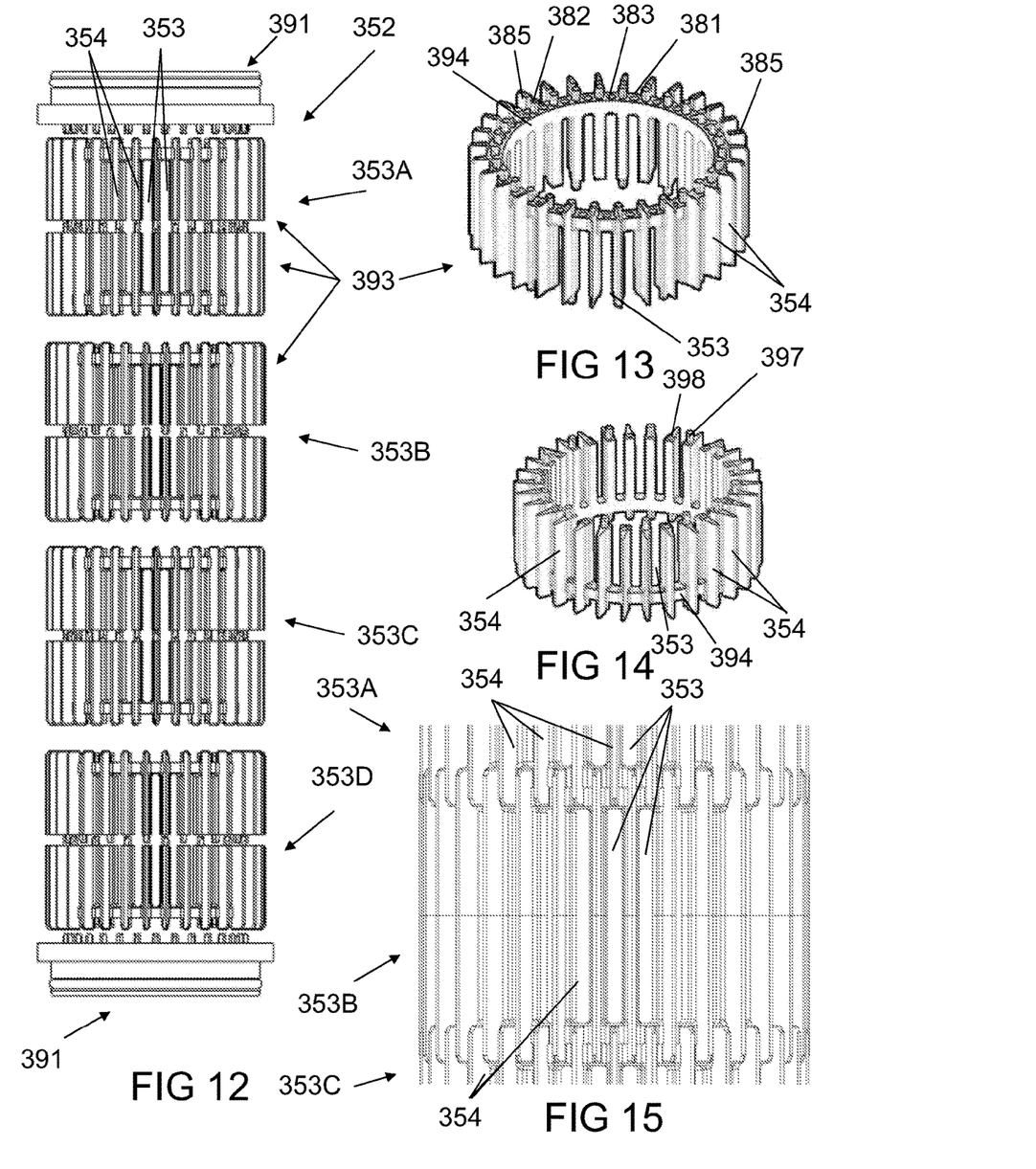
FIG. 12 shows a supporting cage for a filter insert according to a second embodiment in an exploded view.
FIG. 13 shows a ribbed element for the supporting cage according to FIG. 12 in perspective view.
FIG. 14 shows the ribbed element from FIG. 13 in perspective view, rotated through 180°.
FIG. 15 shows three interconnected ribbed elements of a supporting cage according to FIG. 12 for the filter insert according to the second embodiment in side view.
Figure 16:
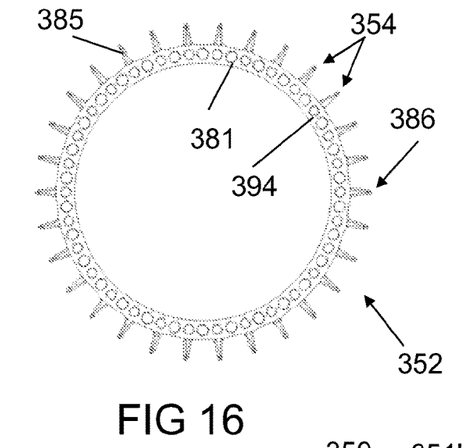
FIG. 16 shows a plan view of a ribbed element of supporting cage according to FIG. 12.

The supporting cage 352 and the four groups 353A to 353D are formed by means of just three different individual parts, namely two end covers 391 of identical construction and, in this case, a total of eight mutually identical ribbed elements 393, wherein in each case two ribbed elements 393 are assembled to form a pair by joining them together in a manner offset by 180° relative to one another, as FIG. 15 clearly shows, in order to form one of the groups 353A to 353D as a ribbed element pair with continuous apertures 353 and ribs 354 within the group. Each ribbed element 393, in turn, is composed of plastic with a base ring 394, on which the individual ribs 354 are formed integrally in such a way that one aperture 353 is formed between two ribs 354 in each case, as can be seen especially clearly from FIGS. 13 and 14. That face of the two faces 381 facing in the axial direction which faces upwards in FIG. 13 is provided alternately in the radial direction, to the inside of the ribs 354, with a locking pin 382 and, in each case between two locking pins 382, with a locking hole 383. As can be clearly seen in FIG. 14, the ribs 354, in turn, are provided alternately on their free rib ends with locking pins 397 and locking holes 398, which, based on the same group, interact with the rib ends 354 of the second ribbed element 393 in the assembled state of two ribbed elements 393, as will be clear, for example, from FIGS. 12 and 15, while the locking holes 383 and locking pins 382 on the base ring 394 in each case interact between adjacent groups and engage in one another. The locking holes 383 and locking pins 382 on the base ring 394 of the respective ribbed elements 393 of the outermost groups 393A, 393D furthermore also interact with corresponding pins and holes on the end covers 391.

As FIGS. 13 to 16 furthermore clearly show, a rib front 385 of each ribbed element 354 in each case extends radially outside the base ring 394. All the ribs 354 extend radially or in a radial direction and they are formed symmetrically with respect to a radial plane which intersects the centre of the supporting cage 352. Each rib front 385, in turn, tapers towards the free front end 386 of the ribs 354 and is designed as a rib tip, wherein the front end 386 is rounded. At the same time, each rib front 385 extends both upwards and downwards in the axial direction relative to the base ring 394, wherein the axial length of the rib 354 or rib front 385 which projects in the axial direction beyond the face 381 of the base ring 394, said face being provided with the locking pins 382 and locking holes 383, is significantly less than on the opposite side of the base ring 394 and corresponds substantially to the thickness of the base ring 394 in the axial direction. This has the effect that the rib 354 of group 353B always extends as far as an aperture 353 of the adjacent groups 353A or 353C and delimits said aperture in the assembled state, as FIG. 15 shows.

Figure 17:
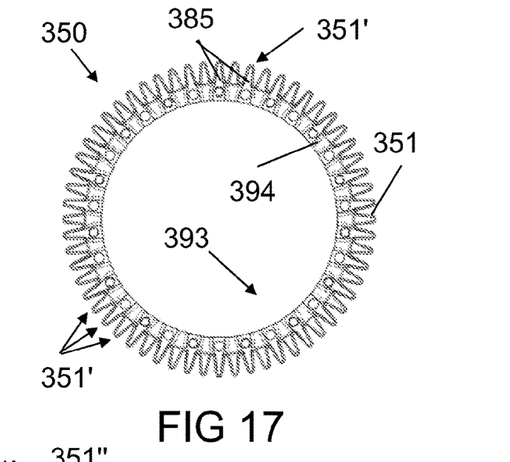
FIG. 17 shows the ribbed element from FIG. 16 with the pleated filtering means mounted thereon.

The embodiment of the supporting cage 352 has particular advantages when using a pleated filtering means. FIG. 17 shows the filter insert 350 in a view corresponding to FIG. 16 with a filtering means 351 already supported by means of the supporting cage 352. The filtering means 351 has a multiplicity of pleating folds 351', wherein the number of pleating folds 351' is twice as large in the illustrative embodiment shown as the number of ribs 354 of a ribbed element 393. In this arrangement, each rib 354 enters completely into one of the pleating folds 351' by means of its rib front 385 projecting radially outwards beyond the base ring 394, and very largely or completely fills said pleating fold 351' on the inside of the filtering means 351. Owing to the alternating arrangement of apertures 353 and ribs 354 between two adjacent groups, the respective pleating fold 351' which is not supported by means of the rib fronts 385 of the ribs 354 in one particular group is then nevertheless supported in the adjacent group by the rib situated there, which enters the pleating fold 351' for this purpose.

Figure 18:
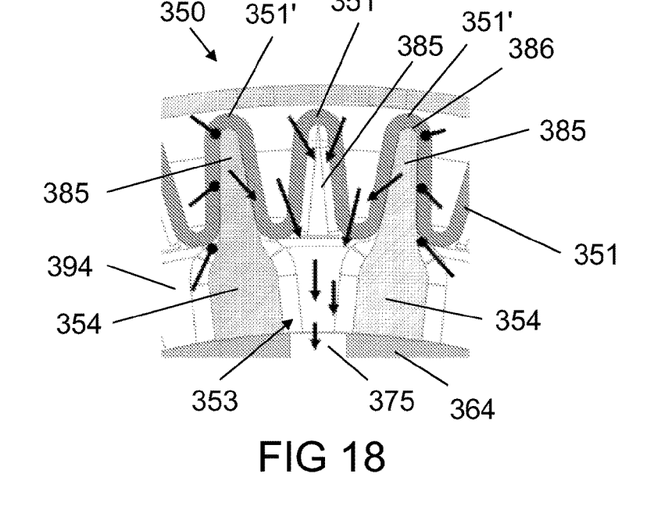
FIG. 18 shows in a detailed view the situation as regards to flow within the backflush cycle at one aperture within the second embodiment of the filter insert.

The flow situation, resulting from the configuration of the filter insert 350, in the return-flow cycle is indicated in FIG. 18. The sectional view in FIG. 18 is such that the section is taken through the apertures 353 and ribs 354 of a group, wherein the ribs 354 enter by means of their rib fronts 385, illustrated in section, into two pleating folds 351', while a further pleating fold 351", which is not supported by means of a rib in the region of said group but is supported in the region of the adjacent group or groups by means of the rib front 385 of the rib 354 situated there, is situated in front of the aperture 353 of said group.

When backflushing of the aperture 353 takes place via the flushing gap 375 of the flushing chamber 64, indicated only schematically in FIG. 18, the filtering means 351 is pulled against the outer flank of the rib fronts 385 entering into the pleating folds 351' and designed as rib points, as indicated by the round heads of the lines, this taking place in the region of the group subject to the flushing cycle, whereby a bypass flow via adjacent pleating folds 351' is prevented in an effective manner and only the pleating fold 351" situated directly in front of the aperture 353 is subjected to the backflushing process, as indicated by the arrows. At the same time, the ribs 354 or rib fronts 385 in the region of the adjacent groups prevent a stray or bypass flow from above or below since, there too, the pleating fold 351" is supported by means of a rib point. Each rib front 385 fits or enters completely by means of its rib point into the pleating fold 351' situated in front of it and extends over the entire depth of the pleating fold 351' as far as the bottom of the respective pleating fold. By means of the rounded front end 386, the rib point or rib front 385 is matched to the contour of the pleating fold 351'. Between two rib fronts 385 or ribs 354, it is also possible for the filter material additionally to come to rest against the outer wall of the base ring 394 by means of its pleating folds and to find further support there.

Numerous modifications which fall within the scope of protection of the attached claims can be obtained from the preceding description by a person skilled in the art. The filtering means can be of single- or multi-ply construction. The number of apertures, the angular offset of the radial outlets and hence the required limited rotary mobility between the hollow shaft and the flushing chambers can vary. The supporting cage can be built without an intermediate ring and could contain just two ribbed elements, which are arranged between two end covers. By stacking a plurality of ribbed elements, as described above, it is then possible to adapt to different filter surface areas and overall lengths of the filter insert and of the backflushing device. Arranging of a pleated filter fabric in such a way that the inner fold touches the outer side of a rib, or that the rib enters at least partially into each fold is the preferred embodiment. However, operation is at most impaired if the number of folds and ribs is different, or if the positioning between fold and rib is not accurate. Thus, in particular, it is possible for there to be more pleating folds than ribs with rib fronts entering into the pleating folds. Consequently, it is also possible for two, three or more pleating folds to be situated in front of an aperture between two ribs, wherein not all the pleating folds are supported by a rib front of a rib in the adjacent group or group(s). It would also be possible to couple the driving means and the gearwheel for conjoint rotation to the flushing chambers and then to take the hollow shaft along as a passive element. The sealing of the supporting cage and of the filtering means between the end covers can be accomplished in different ways. Such modifications and other modifications are intended to fall within the scope of protection of the attached claims. Moreover, the illustrative embodiments shown represent only the preferred embodiments without restricting the scope of protection thereto.

Further, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A backflush filter for liquid media, having a filter housing that has a filter inlet, a filter outlet and a flushing connection, having a filter insert, being fixedly arranged in the filter housing, flowable through by the medium to be filtered from the inside to the outside and formed by way of at least one supporting cage, which has at least two groups of slot-type apertures, and at least one filtering means supported on the supporting cage, wherein the apertures within each group extend in parallel alignment with one another and are separated from one another by mutually parallel ribs of the supporting cage, the backflush filter further including a backflushing device, which is arranged in the interior of the filter insert, the backflushing device is rotatable in the filter insert about an axis by way of an actuating drive, the filter insert has at least one slit and extends over the height of the filter insert, the backflushing device serving for zone-wise flushing of the at least one filtering means via the slit and apertures and for carrying filter residues to the flushing connection during a backflush cycle, wherein the slot-type apertures of one group are arranged offset relative to those of the other group(s), and the apertures of one group lie in a common plane with the ribs of the other group(s), the backflushing device having at least two mutually separate flushing chambers, arranged vertically offset relative to one another and having associated slits, and a hollow shaft, which is capable of limited rotary motion relative to the flushing chambers and has a first radial outlet in the region of the first flushing chamber and a second radial outlet in the region of the second flushing chamber, which second radial outlet is arranged on the hollow shaft in a manner vertically offset and circumferentially offset relative to the first radial outlet, wherein the direction of movement of the backflushing device is reversable by way of the actuating drive during the backflush cycle, and driving means for simultaneous movement of the flushing chambers and the hollow shaft in the respective direction of motion after a reversal of direction and for rotation of the hollow shaft and the flushing chambers relative to one another are provided for both directions of motion.

2. The backflush filter according to claim 1, wherein the hollow shaft is coupled for conjoint rotation to the actuating drive, wherein coupling is accomplished by way of a geared mechanism.

3. The backflush filter according to claim 1, wherein the actuating drive comprises a rack capable of linear motion, which meshes with a gearwheel coupled to the backflushing device for rotation of the backflushing device, wherein the actuating drive comprises a pneumatic linear drive.

4. The backflush filter according to claim 3, wherein a flushing valve, being openable and closable by way of a movement of the rack, is assigned to a sludge outlet.

5. The backflush filter according to claim 4, wherein the rack is provided with a cam surface as switching cam for actuating the flushing valve, wherein the flushing valve is movable into an open position during the backflush cycle by way of the rack, counter to the restoring force of a return spring.

6. The backflush filter according to claim 1, wherein each flushing chamber and the associated slit have a height which is matched to the height of the slot-type apertures of the first groups or of the second group.

7. The backflush filter according to claim 1, wherein the flushing chambers are rotatable by at least 360° in both directions of motion by way of the actuating drive during a backflush cycle.

8. The backflush filter according to claim 1, wherein the flushing chambers has chamber modules of the same type, which are connected detachably to one another, wherein two chamber modules in each case are assembled to form a double chamber, wherein all the chamber modules are connected by way of through-rods to form a flushing chamber insert, which is supported with the ability for partial rotary motion on the hollow shaft.

9. The backflush filter according to claim 1, wherein the filter insert has a plurality of subgroups, wherein each subgroup comprises a group of first apertures and a group of second apertures, and the hollow shaft has precisely two radial outlets positioned in a circumferentially offset and vertically offset manner, wherein the first radial outlet is assigned to the uppermost subgroup(s) and the second radial outlet is assigned to the lower subgroup(s).

10. The backflush filter according to claim 1, wherein the filtering means includes a pleated filter fabric or filter cloth, being arranged between the supporting cage and a supporting casing, wherein each pleating fold is assigned a plurality of apertures of different groups of first apertures or of second apertures.

11. The backflush filter according to claim 1, wherein the apertures and/or the ribs of each group run oblique with respect to a radial plane, with the apertures of the one group and the apertures of the other group run inclined to the radial plane by the same angle, but in opposite directions.

12. The backflush filter according to claim 1, wherein the filtering means includes a pleated filter fabric or filter cloth having pleating folds, and each of the ribs fits by way of a rib front into respective pleating folds.

13. The backflush filter according to claim 12, wherein at least one of a plurality of apertures of different groups of first apertures or of second apertures are assigned to each pleating fold, and the rib front of each rib extends as far as the fold base of one pleating fold.

14. The backflush filter according to claim 12, wherein at least one of all of the each ribs extend radially and are formed symmetrically with respect to a radial plane and the rib front of each rib is designed as a rib tip tapering to a free front end thereof.

15. The backflush filter according to claim 1, wherein the supporting cage is of modular construction and has a plurality of mutually substantially identical annular ribbed elements, which are enclosed between two end covers, wherein each of the plurality of mutually substantially identical annular ribbed elements has at least one base ring, on which a plurality of ribs positioned in a manner circumferentially offset relative to one another are integrally formed, wherein at least one of the supporting cage has an even number of ribbed elements and two of the plurality of annular ribbed elements form a ribbed element pair in each case, the rib element pairs being clamped between the end covers with their base rings abutting one another.

16. The backflush filter according to claim 15, wherein the ribs are formed on the front side of the base ring and inclined to a radial line, with several of the ribbed element pairs being arranged between end covers, wherein an intermediate ring is arranged between each of the ribbed element pairs.

17. The backflush filter according to claim 16, wherein each rib of the rib elements comprise at their free rib ends integrally formed locking pins for interlocking with locking holes in the end covers or intermediate rings.

18. The backflush filter according to claim 15, wherein the ribs of the ribbed elements are provided alternately at their free rib ends with integrally formed locking pins or locking holes, and the base ring is provided alternately on one face with locking pins and locking holes, which interact in the assembled state, wherein rib fronts of the ribs extend radially outside the base ring.

19. Backflush filter according to claim 18, wherein the rib fronts of the ribs extend radially outside the base ring, with the rib fronts projecting on both sides up and down over the front sides of the base ring, with the rib fronts projecting outside of the front side of the base ring, being equipped with the locking holes, corresponding to the thickness of the base ring.

20. The backflush filter according to claim 15, wherein the end covers are connected to one another by way of anchor rods, with the supporting cage and the filtering means, being arranged between the supporting cage and the supporting casing are at least one of enclosed and sealingly glued between the end covers.

21. A filter insert for the backflush filter according to claim 1, the filter insert comprising a supporting cage for supporting the filtering means, the supporting cage having at least two groups of slot-type apertures, which, within each group, extend in parallel alignment with one another and are separated from one another by mutually parallel ribs of the supporting cage, wherein the slot-type apertures of one group are arranged offset relative to those of the other group(s), and the apertures of one group lie in a common plane with the ribs of the other group(s), at least one of the apertures and the ribs of each group run oblique with respect to a radial plane, with the apertures of the one group and the apertures of the other group run inclined to the radial plane by the same angle, but inclined in opposite directions.

22. The filter insert according to claim 21, wherein the filtering means includes a pleated filter fabric or filter cloth, being arranged between the supporting cage and a supporting casing, wherein a plurality of superimposed apertures of the supporting cage is assigned to each pleating fold.

23. The filter insert according to claim 21, wherein the supporting cage is of modular construction and has a plurality of mutually identical annular ribbed elements, which are enclosed between two end covers, wherein each ribbed element has at least one base ring, on which a plurality of ribs positioned in a manner circumferentially offset relative to one another are integrally formed, wherein the supporting cage has an even number of ribbed elements, and/or two ribbed elements in each case form a ribbed element pair, these being clamped between the end covers with their base rings abutting one another.

24. The filter insert according to claim 23, wherein the ribs are formed on the front side of the base ring and run inclined to a radial line, with several pairs of ribbed elements being arranged between end covers, wherein an intermediate ring is arranged between each pair of ribbed elements, and each rib of the rib elements comprise at their free rib ends integrally formed locking pins for interlocking with locking holes in the end covers or intermediate rings.

25. The filter insert according to claim 23, wherein the end covers are connected to one another by way of anchor rods, with the supporting cage and the filtering means, being arranged between the supporting cage and the supporting casing, being enclosed wherein the filtering means is a pleated filtering means.

26. A filter insert for a backflush filter according to claim 1, the filter insert comprising a supporting cage for supporting the filtering means, the supporting cage has at least two groups of slot-type apertures, which, within each group, extend in parallel alignment with one another and are separated from one another by mutually parallel ribs of the supporting cage, wherein the slot-type apertures of the one group are arranged offset relative to those of the other group(s), and the apertures of one group lie in a common plane with the ribs of the other group(s), the filtering means includes a pleated filter fabric or filter cloth, and each of the ribs fits by way of a rib front into one of respective pleating folds.

27. The filter insert according to claim 26, wherein at least one of a plurality of apertures of different groups of first apertures or of second apertures are assigned to each pleating fold and the rib front of each rib extends as far as the fold base of one pleating fold.

28. The filter insert according to claim 26, wherein at least one of all the ribs extending radially and are formed symmetrically with respect to a radial plane and the rib front of each rib is designed as a rib tip tapering to the free front end thereof.

29. The filter insert according to claim 28, wherein the ribs of the ribbed elements are provided at their free rib ends with at least one of integrally formed locking pins and locking holes, and the base ring is provided on one face with the other of the at least one of locking pins and locking holes, which interact in the assembled state, wherein the rib fronts of the ribs extend radially outside the base ring.

30. The filter insert according to claim 28, wherein the rib fronts of the ribs extend radially outside the base ring, with the rib fronts projecting on both sides up and down over the front sides of the base ring, with the rib fronts projecting outside of the front side of the base ring, being equipped with the locking holes, with a projection corresponding to the thickness of the base ring.

* * * * *

UNITED STATES PATENT AND TRADEMARK OFFICE
CERTIFICATE OF CORRECTION

| | |
|---|---|
| PATENT NO. | : 10,035,085 B2 |
| APPLICATION NO. | : 14/897711 |
| DATED | : July 31, 2018 |
| INVENTOR(S) | : Karsten Cartarius et al. |

It is certified that error appears in the above-identified patent and that said Letters Patent is hereby corrected as shown below:

On the Title Page

Item (73) Assignee should read:
Boll & Kirch Filterbau GmbH

Signed and Sealed this
Twenty-seventh Day of November, 2018

Andrei Iancu
*Director of the United States Patent and Trademark Office*